United States Patent [19]

Cook et al.

[11] Patent Number: 4,549,570

[45] Date of Patent: Oct. 29, 1985

[54] WASTE DISPOSAL MONITORING SYSTEM

[76] Inventors: Kenneth D. Cook, 3701 Godfrey, Midland, Tex. 79701; Timothy R. Proctor, 1117 Overton, Odessa, Tex. 79763

[21] Appl. No.: 433,841

[22] Filed: Oct. 12, 1982

[51] Int. Cl.[4] .................. G05B 13/00; G05D 7/00
[52] U.S. Cl. ..................... 137/389; 137/392; 137/467.5; 137/558; 340/529; 340/609; 377/21
[58] Field of Search .............. 137/389, 392, 467.5, 137/558; 340/500, 501, 309.15, 609, 527, 529; 377/20, 21

[56] References Cited

U.S. PATENT DOCUMENTS

| 2,100,052 | 11/1937 | Hejduk et al. | 73/198 |
|---|---|---|---|
| 2,977,024 | 3/1961 | Harris | 222/2 |
| 2,995,275 | 8/1961 | Brice | 222/26 |
| 3,026,032 | 3/1962 | Settlemire | 235/94 |
| 3,099,366 | 7/1963 | Reilly | 222/20 |
| 3,168,218 | 2/1965 | Funk et al. | 222/23 |
| 3,241,063 | 3/1966 | Beattie et al. | 377/20 |
| 3,244,323 | 4/1966 | Stankiewicz | 222/26 |
| 3,430,252 | 2/1969 | Bonner | 346/43 |
| 3,484,020 | 12/1969 | Houle et al. | 222/2 |
| 3,497,107 | 2/1970 | Tatsuno | 222/26 |
| 3,510,630 | 5/1970 | Ryan et al. | 235/92 |
| 3,603,481 | 9/1971 | Dilger et al. | 222/23 |
| 3,685,692 | 8/1972 | Erne et al. | 222/23 |
| 3,711,689 | 1/1973 | Park | 377/21 |
| 3,876,867 | 4/1975 | Schull et al. | 377/20 |
| 3,952,592 | 4/1976 | Schlatter et al. | 377/21 |
| 4,021,794 | 5/1977 | Carlson | 340/527 |
| 4,186,849 | 2/1980 | Spangler | 137/392 |
| 4,217,644 | 8/1980 | Kato et al. | 377/21 |
| 4,292,994 | 10/1981 | Johnson et al. | 137/351 |
| 4,304,989 | 12/1981 | Vos et al. | 377/21 |
| 4,335,378 | 6/1982 | Coleman | 340/529 |
| 4,441,102 | 4/1984 | Webb | 340/529 |

FOREIGN PATENT DOCUMENTS 2061583  5/1981  United Kingdom .............. 340/501

Primary Examiner—George L. Walton
Attorney, Agent, or Firm—Richards, Harris, Medlock & Andrews

[57] ABSTRACT

A monitoring system (10) for a fluid waste disposal system is provided. Fluid waste is transported from a source (12) through a valve (16) to a reservoir (14) under access control provided by access switches (40). The monitoring system (10) includes density circuitry (64) for monitoring the density of fluid being deposited into the reservoir (14). Level detector circuitry (90) is provided for monitoring the level of fluid which has been deposited in the reservoir (14). The monitoring system (10) further includes a counter (56) for counting the number of times the valve (16) has been actuated. Counter delay circuitry (54) provides an output to counter (56) to positively indicate that an access switch (40) has been actuated.

3 Claims, 4 Drawing Figures

WASTE DISPOSAL MONITORING SYSTEM

TECHNICAL FIELD

This invention relates to monitoring systems, and more particularly to a waste disposal monitoring system.

BACKGROUND ART

In the course of oil exploration, wells are drilled into the earth's surface. During such drilling operations, drilling fluids are utilized for lubrication purposes and several waste by-products are generated such as, for example, salt water, drilling muds, additives and chemicals. The disposal of these by-products must be accomplished in an environmentally safe manner under controlled circumstances to account for the amount of waste which is disposed.

Typically, tank trucks transport the drilling waste from a drilling site to a storage or reservoir facility. The reservoir may consist of above ground storage tanks, open pits, or underground rock formations. The owner of the storage facility desires to maintain accurate records of the amount of waste being deposited at his storage facility to both prevent overflow of his facility and accurately invoice users for the use of his disposal site. Further, the owner desires to monitor the type of waste being disposed to ensure that undesirable materials will not be deposited at the waste disposal site.

Previously developed disposal systems have required a user to manually document the amount of material being deposited at the disposal site. In order to accurately monitor the amount of waste being disposed, such previously developed systems required the presence of the owner to monitor the type of waste being deposited as well as whether the depositor was authorized to use the reservoir site. It was therefore necessary for the continuous monitoring by the reservoir site owner of the site which resulted in a costly and inefficient operation.

A need has thus arisen for a waste disposal system which automatically and accurately monitors the users of such a system to permit only selective users to dispose of waste material. Additionally, such a system requires the monitoring of the type of waste material being deposited. Furthermore, a need has arisen for a waste disposal monitoring system which monitors the amount of waste material present at the reservoir site. A need has further arisen for an accurate monitoring system for detecting the amount of material deposited by a particular user of the disposal system.

DISCLOSURE OF THE INVENTION

In accordance with the present invention, a waste disposal monitoring system is provided which substantially eliminates the problems heretofore associated with waste disposal systems.

In accordance with the present invention, a monitoring system for a fluid waste disposal system wherein fluid is transported from a source to a waste disposal reservoir is provided. A sensor is provided for sensing the density of the fluid and for generating an output signal when the density of the fluid increases above a predetermined level. A first counter is provided which is responsive to the sensor output signal for generating an alarm signal. A second counter is interconnected to the first counter for resetting the first counter if the alarm signal is not generated within a predetermined time to thereby prevent generation of the alarm signal for the intermittent presence of fluid having a density above the predetermined level. Circuitry is provided which is responsive to the alarm signal for preventing the continued flow of fluid from the source to the waste disposal reservoir.

In accordance with another aspect of the present invention, a monitoring system for a fluid waste disposal system wherein fluid is transported from a source through a valve to a waste disposal reservoir is provided. Structure is provided for actuating the valve to permit fluid to flow from the source to the waste disposal reservoir. Circuitry is associated with the actuating structure for counting the number of times the valve has been actuated. The counting circuitry is incremented only after a predetermined time period after each actuation of the actuating structure to thereby prevent inadvertent incrementation of the counter.

In accordance with yet another aspect of the present invention, a monitoring system is provided for a fluid waste disposal system wherein fluid is transported from a source through a valve to a waste disposal reservoir and includes a sensor for sensing the fluid level in the reservoir and for generating a level output signal. An additional sensor is provided for sensing whether fluid is being transported through the valve and for generating a flow output signal. Circuitry is responsive to the level output signal and the flow output signal to deactivate the valve to thereby prevent fluid flow to the waste disposal reservoir.

BRIEF DESCRIPTION OF THE DRAWINGS

For a more complete understanding of the present invention and for further advantages thereof, reference is now made to the following Detailed Description, taken in conjunction with the accompanying Drawings in which.

DETAILED DESCRIPTION

Figure 1:
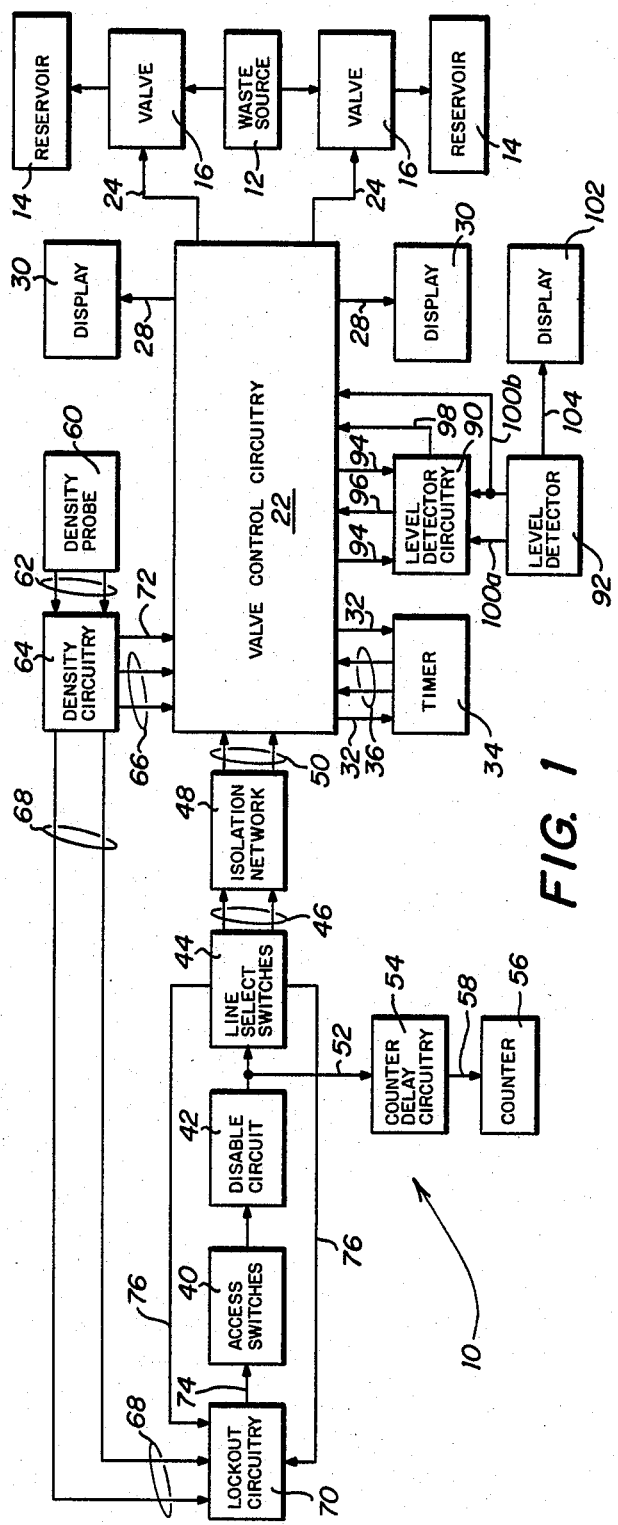
FIG. 1 is a schematic block diagram of the present monitoring system.

Referring to FIG. 1, a block diagram of the present waste disposal monitoring system is illustrated and is generally identified by the numeral 10. It will be understood that the present monitoring system has numerous uses for the monitoring of fluids such as, for example, salt water, drilling mud, chemicals and other fluids associated with oil well production, but is not limited to such use. Fluid waste from a waste source 12 is deposited at a waste disposal site or reservoir 14 through a valve 16. Valve 16 controls the flow of fluid from waste source 12 to the reservoir 14. As used herein, the term "reservoir" shall mean, but is not limited, for example, above ground tanks, underground formations, open pits or any other facility for storing fluids. As illustrated in FIG. 1, two such valves 16 and reservoirs 14 are illustrated. Monitoring system 10 can be utilized with any number of waste disposal sites having reservoirs 14, and only two such reservoirs 14 are illustrated for simplicity. Waste source 12 may comprise, for example, a tank truck.

Valves 16 are controlled through operation of valve control circuitry 22 which actuates and deactivates each valve 16 via signal line 24. When actuated, valves 16 permit fluid to flow from the waste source 12 to reservoir 14.

Valve control circuitry 22 provides an output signal via signal line 28 to a display 30 for indicating the operability status of valve 16. Display 30 may include, for example, a lamp to indicate that valve 16 is operable and a horn to generate warning auditory signals indicating that valve 16 will be closed if it is desired to terminate the transfer of waste from waste source 12 to reservoir 14 during the disposal process. A display 30 will be associated with each valve 16.

Valve control circuitry 22 further provides an output signal via signal line 32 to a timer 34. When valve 16 is actuated, timer 34 is actuated by valve control circuitry 22. After a predetermined time interval established by timer 34, timer 34 outputs a signal via signal line 36 to valve control circuitry 22 to terminate operation of valve 16. Signal lines 32 and 36 and a timer 34 are associated with each valve 16. In this manner, valve control circuitry 22 automatically controls the length of time a valve 16 is operable to thereby control the amount of waste transported to reservoir 14 upon each individual actuation of valve 16.

Actuation of valve 16 via control circuitry 22 is controlled by access switches 40. Access switches 40 permit only individual authorized users of the waste disposal system being monitored by monitoring system 10 to gain access for the waste disposal system. Access switches 40 provide a measure of security for the waste disposal system and allow the operator of reservoir 14 to control the access to his facility in that only specific users will be able to actuate valve 16 in order to dispose of waste material. Access switches 40 may comprise, for example, key switches in which a key actuates the system, a credit card-like entry system in which a user has a unique encoded card which is inserted into access switches 40 or a numerical entry system when the user enters his unique identification code through a numerical key pad. Each user of the waste disposal system has a unique code or key to gain access to monitoring system 10. The number of access switches 40 may vary depending upon the number of users using a reservoir 14.

The output of access switches 40 is applied to a disable circuit 42. Disable circuit 42 if actuated will prevent the output of access switches 40 from being applied to valve control circuitry 22. If disabled, circuit 42 has not been set by the operator for a particular switch of access switches 40. The output of access switches 40 is applied via disable circuit 42 to line select switches 44. Line select switches 44 are selectable for selecting a particular fill line the user of the waste system will utilize to dispose of his material. Associated with each fill line is a valve 16 and reservoir 14. As previously stated, two such fill lines are illustrated in FIG. 1.

An output 46 associated with each fill line, depending upon the line selected by line select switches 44, is applied to an isolation network 48 whose output is applied via signal line 50 to valve control circuitry 22. The input to valve control circuitry 22 via signal line 50 actuates the valve 16 associated with the particular fill line selected by the user of the waste disposal system.

An output from disable circuit 42 is applied via signal line 52 to counter delay circuitry 54. The output of counter delay circuitry is applied to a counter 56 via signal line 58. A counter 56 and counter delay circuitry 54 is associated with each switch of access switches 40. Counter 56 counts the number of times a particular user accesses the waste disposal system through access switches 40 being monitored by monitoring system 10. In this manner, the operator of the waste disposal system can maintain an accurate record of the number of times a user disposes waste material for billing purposes. Counter delay circuitry 54 operates to delay the incrementation of counter 56 to prevent inadvertent advancements of counter 56 as will subsequently be described with respect to FIG. 4.

Associated with each fill line of the waste disposal system is a density probe 60. Density probe 60 monitors the density of the waste material being transported through valve 16 to reservoir 14 for each fill line. Density probe 60 may comprise, for example, a level detecting device manufactured by ASI-Keystone, Inc., Houston, Tex. which is sold under the name Kasitrol. The output of density probe 60 for each fill line is applied via signal line 62 to density circuitry 64. Density circuitry 64, as will subsequently be described with respect to FIG. 2, monitors the density of the material passing through valve 16.

If the density of the waste material increases above a predetermined level where, for example, mud, cotton seed hulls or drilling fluid is present in the waste material passing through valve 16 to reservoir 14, density circuitry 64 will provide output signals via signal line 66 to valve control circuitry 22 and via signal line 68 to lock-out circuitry 70. The output of density circuitry 64 via signal line 66 associated with each fill line of the waste disposal system will provide an input signal to valve control circuitry 22 to deactivate the valve 16 to thereby prevent the disposal of that product into reservoir 14. Additionally, density circuitry 64 will generate an output signal via signal line 72 to valve control circuitry 22 to actuate display 30 via signal line 28 to provide a signal indicating that the valve 16 will be deactuated.

Actuation of lock-out circuitry 70 via the output of density circuitry 64 through signal line 68 will prevent subsequent actuations by the user of the waste disposal system for a predetermined amount of time after valve 16 has been deactuated. The output of lock-out circuitry 70 is applied via signal line 74 to access switches 40 to thereby control the actuation of access switches 40. An additional input to lock-out circuitry 70 is applied from line select switches 44 via signal line 76 to indicate to lockout circuitry 70 which fill line of the waste disposal system had been selected to prevent subsequent use of the selected fill line by the user of the waste disposal system for the preselected amount of time. In this manner, the present monitoring system 10 will prevent the disposal of undesirable waste material into reservoir 14.

Associated with valve control circuitry 22 is level detector circuitry 90 which receives an output signal from a level detector 92 associated with each reservoir 14. Level detector circuitry 90 will be subsequently described with respect to FIG. 3 and functions to deactuate valve 16 when the level of fluid in reservoir 14 reaches a predetermined level to thereby prevent reservoir 14 from overflowing. Outputs from valve control circuitry 22 via signal line 94 indicate which fill line of the waste disposal system is being utilized. An output of level detector circuitry 90 is applied via signal line 96 to valve control circuitry 22 to provide an input to valve control circuitry 22 to disable valve 16 via signal line 24.

A further output of level detector circuitry 90 is applied to valve control circuitry 22 via signal lines 98, 100a and 100b to control display 30 via signal line 28 to provide an auditory alarm through display 30 indicating the level of the fluid in reservoir 14, either an almost full condition or a full condition, and that an operating valve will be deactuated. An output of level detector 92 is also applied to a display 102 via signal line 104 to display whether the reservoir 14 is full or in an almost full condition.

Figure 2:
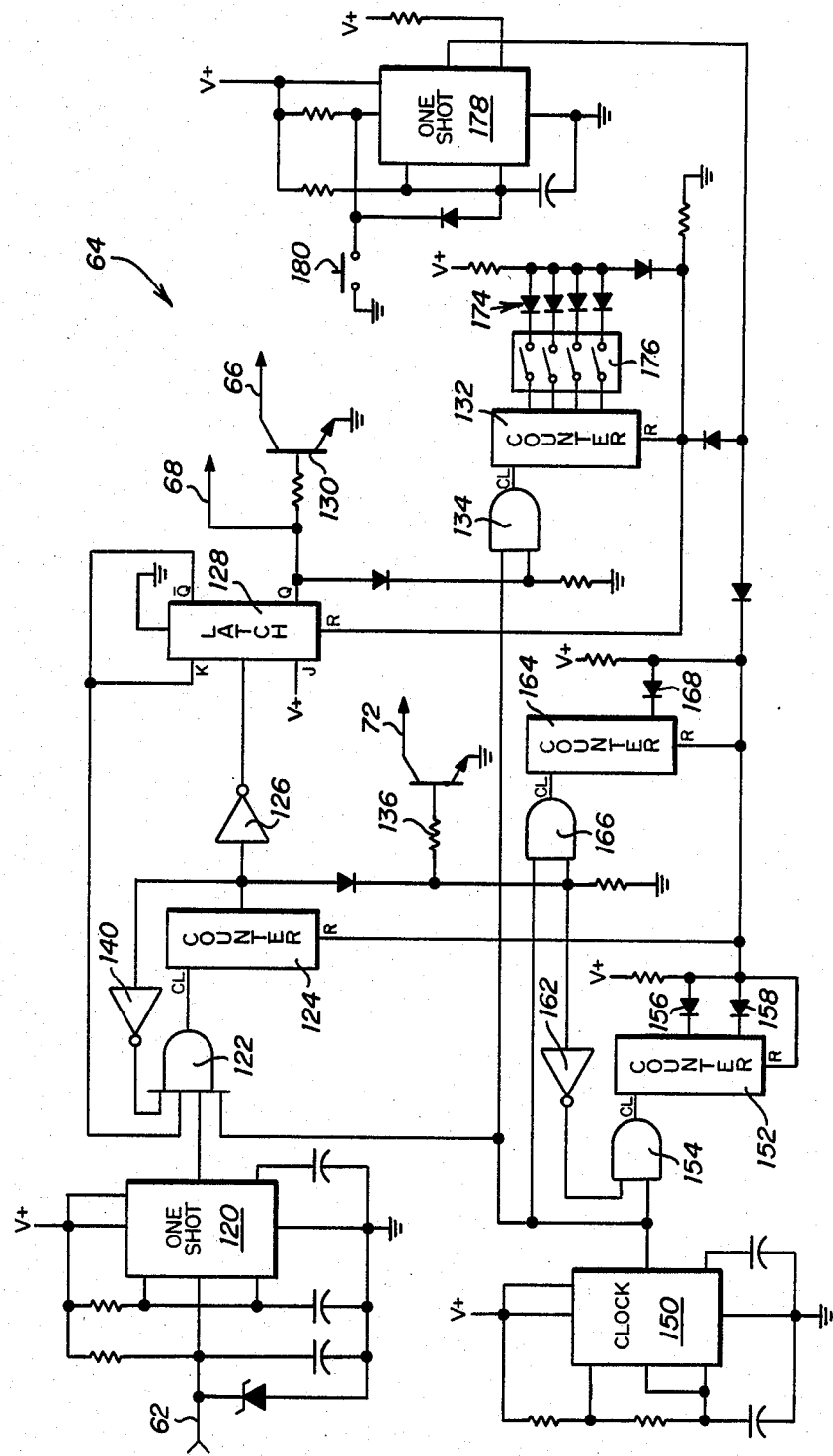
FIG. 2 is a schematic logic circuit diagram of the density circuitry illustrated in FIG. 1.

Referring now to FIG. 2, density circuitry 64 is illustrated. FIG. 2 illustrates circuitry associated with one fill line, it being understood that similar such circuitry will be repeated within monitoring system 10 for each fill line of the system. Density circuitry 64 functions to monitor the output of density probe 60 for density levels above a predetermined level. The output of density circuitry 64 provides an output via signal line 72 to actuate display 30 which may comprise an auditory alarm. Further, via signal line 66, density circuitry 64 controls the deactuation of a valve 16 as well as providing an output via signal line 68 to prevent further actuation of access switches 40.

The output of density probe 60 (FIG. 1) is applied via signal line 62 to a one shot trigger circuit 120. The output of one shot trigger circuit 120 provides a filtered pulse indicating that there has been a change in the density of the material passing through the valve 16 which is above the predetermined desired level. The output of one shot trigger is applied to a four-input AND gate 122 whose output provides a clock signal to a counter 124. The output of counter 124 is applied through an inverter 126 to a latch 128. The output of latch 128 provides an output to signal line 68 (FIG. 1), an output to a transistor 130 for generating an output via signal line 66 (FIG. 1), and an output to a counter 132 via an AND gate 134. The output of counter 124 is also applied to a transistor 136 for generating the output signal via signal line 72 (FIG. 1) to generate the auditory alarm via display 30 (FIG. 1).

When counter 124 reaches its maximum count and provides its output to latch 128, it further provides this output via an inverter 140 to AND gate 122 to disable counter 124 from counting any further. The output of latch 128 is also applied to AND gate 122 to disable counter 124 when the monitoring system 10 has been deactuated.

Density circuitry 64 further includes a clock 150 which provides a clock signal to a counter 152 via an AND gate 154. Clock 150 also provides an input to AND gate 122 and AND gate 134. It therefore can be seen that in order for counter 124 to continuously count, all four input signals must be high to AND gate 122. The output of counter 152 through diodes 156 and 158 provides a reset to counter 124 so that counter 124 can again begin its count prior to a time when counter 124 had been disabled upon the next output of density probe 60 (FIG. 1). Counter 152 is disabled by the output of counter 124 which is applied through an inverter 162 to AND gate 154 such that counter 152 terminates its counting when the system is deactuated.

As previously stated, the output of counter 124 which is applied through transistor 136 to signal line 72 (FIG. 1), controls the actuation of an auditory alarm within display 30. The duration of this auditory alarm is controlled by a counter 164 which is actuated by the output of counter 124 through an AND gate 166. AND gate 166 further receives an input from clock 150. When counter 164 times out, its output is applied via a diode 168 to reset counter 124 which in turn terminates the output on signal line 72.

Through the operation of counters 152 and 124, valve 16 (FIG. 1) will be deactuated upon the detection of a high density material passing through valve 16 only if such material passes through valve 16 for a predetermined amount of time, which is established by counter 152. In this manner, valve 16 will remain actuated even if there is an intermittent detection of material having a density above the predetermined desired level. If counter 124 has not timed out within the interval set by counter 152, counter 152 will reset counter 124 to begin its count upon the next detection of a density level above the desired level. If counter 124 reaches its count before counter 152 applies the reset to counter 124, the output of counter 124 will provide outputs via signal lines 66, 68 and 72 to actuate display 30, deactuate valve 16 and provide an input to lock-out circuitry 70 (FIG. 1). Density circuitry 64 will therefore only deactuate valve 16 upon the detection of an undesirable density level occurring for a sufficient length of time to indicate that the waste material is in fact a bad product.

As previously stated, the output of latch 128 is also applied to a counter 132. Counter 132 provides a reset to counters 124, 152 and 164 as well as to latch 128. This reset reinitializes monitoring system 10 to permit a user to reaccess monitoring system 10 through actuation of an access switch 40 (FIG. 1). The amount of time before counter 132 times out to generate its output through diodes 174 is controlled by the setting of switches 176. Monitoring system 10 can therefore be shut down for a predetermined time after the detection of that bad product which resulted in the deactuation of a valve 16 (FIG. 1).

Density circuitry 64 further includes a one shot circuit 178 which upon actuation through a switch 180, will reset counters 124, 152, 164 and 132 in addition to latch 128 when power is reapplied to density circuitry 64 after a power failure.

Figure 3:
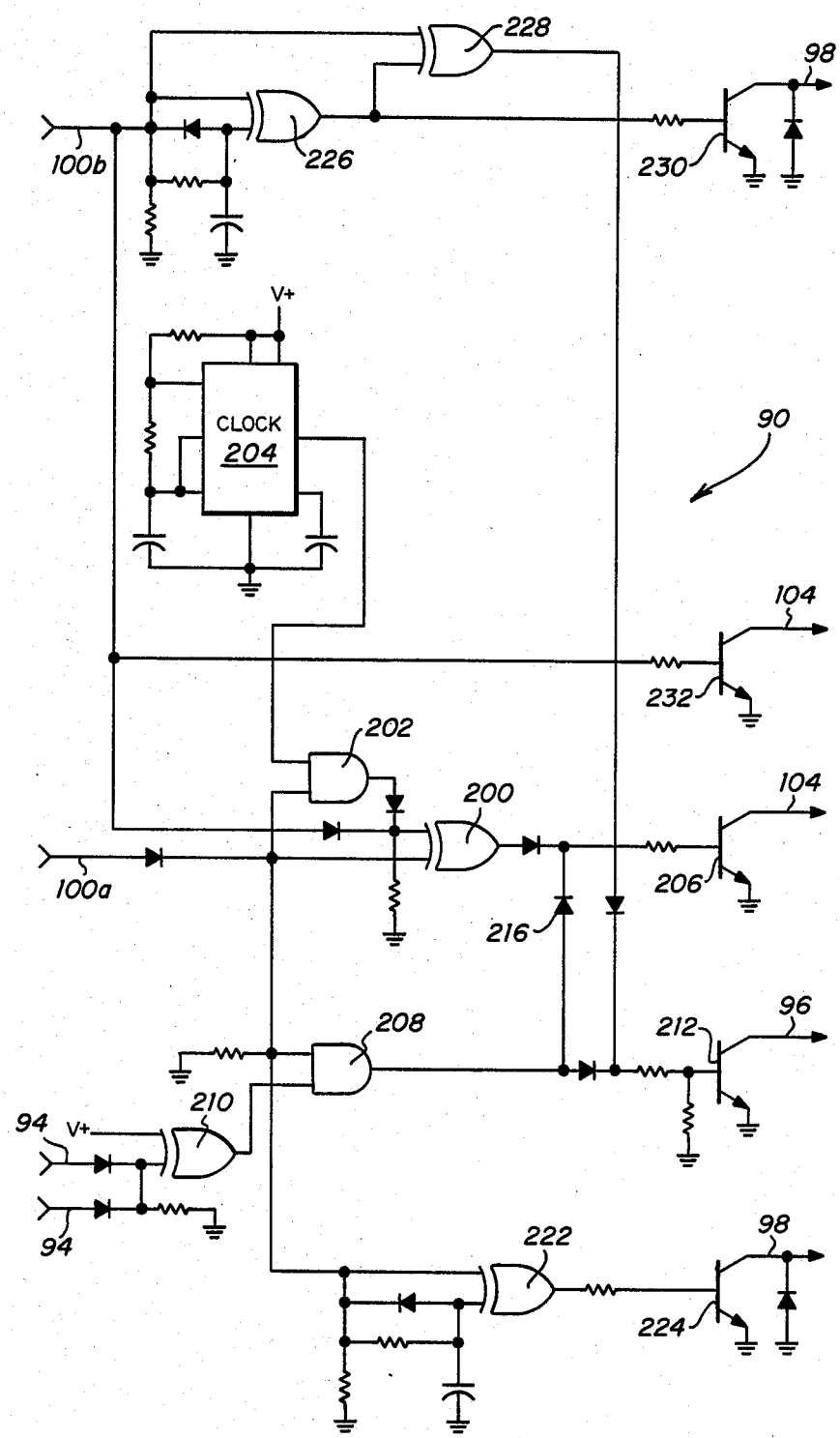
FIG. 3 is a schematic logic circuit diagram of the level detector circuitry illustrated in FIG. 1.

Referring now to FIG. 3, level detector circuitry 90 in combination with level detector 92 will now be described. Level detector circuitry 90 may operate for a one or two fill line system and functions to deactuate valve 16 to prevent reservoir 14 from overflowing. The output of level detector 92 occurs when the fluid level in reservoir 14 rises to a predetermined level. When such a level is detected, level detector 92 will generate an output via signal line 100a which is applied to an exclusive OR gate 200 which also receives a clock signal through an AND gate 202 generated by a clock circuit 204. The output of exclusive OR gate 200 is applied to a transistor 206 which generates a signal via signal line 104 to display 102. If the system is a dual level system, including a warning level as well as a full level, display 102 will then flash to indicate that reservoir 14 is almost full. If the system is a single level system, display 102 will be illuminated continuously indicating a tank full condition.

Level detector 92 also applies its output via signal line 100a to an AND gate 208. If a fill line is in operation and a valve 16 is actuated, valve control circuitry 22 will apply a signal via signal line 94, depending upon which fill line is at the warning level and thus being utilized, to an exclusive OR gate 210. The output of exclusive OR gate 210 provides an input to AND gate 208. The output of AND gate 208 is applied to a transistor 212 which generates an output via signal line 96 to valve control circuitry 22 to deactuate valve 16. If no fill line is being utilized, exclusive OR gate 210 will also apply its output to AND gate 208 such that transistor 212 will generate its output via signal line 96 to valve control circuitry 22 in order to prevent actuation of a valve 16. The output of AND gate 208 is also applied through a diode 216 to continuously illuminate display 102. In a dual level fill system, diode 216 is omitted, since both the outputs of transistors 206 and 212 are utilized to display a tank full and tank almost full condition, whereas in a single level fill system, the output of transistor 206 (almost full in dual level fill system) becomes the tank full indication.

If a valve 16 (FIG. 1) is actuated, AND gate 208 will not generate an output via signal line 96 to deactuate valve 16. When a signal from level detector 92 is received via signal line 100a, this signal will be applied to an exclusive OR gate 222 whose output is applied to a transistor 224 to generate an output signal via signal line 98 to valve control circuitry 22. This signal will cause valve control circuitry 22 to provide an output via signal line 28 to display 30 to sound an auditory alarm which will indicate that the actuated valve will be deactuated after the user has completed disposal of the waste material.

In a reservoir system in which a second level detector 92 is utilized, after the first level of waste material in reservoir 14 has been reached, indicated by an output on signal line 100a, display 30 provides a first alarm signal. The user of the waste disposal system may continue to deposit material until a second level of reservoir 14 is reached in which case a signal will be generated via signal line 100b which is applied to an exclusive OR gate 226, an exclusive OR gate 228 as well as exclusive OR gate 200. The output of exclusive OR gate 226 is applied to a transistor 230 which generates an output signal via signal line 98 to valve control circuitry 22, such that display 30 will generate a second type of auditory alarm signal after this alarm has sounded. The output of exclusive OR gate 228 is applied to transistor 212 to generate a signal via signal line 96 to valve control circuitry 22 to thereby deactuate valve 16. The deactuation of valve 16 will take place regardless of whether there are inputs present via signal line 94 to exclusive OR gate 210. In this manner, the user of the waste disposal system will be prevented from further depositing of waste material since reservoir 14 is in an overflow condition. The signal on signal line 100b is also applied to a transistor 232 to generate a signal via signal line 104 to display 102 to indicate a tank full condition.

Figure 4:
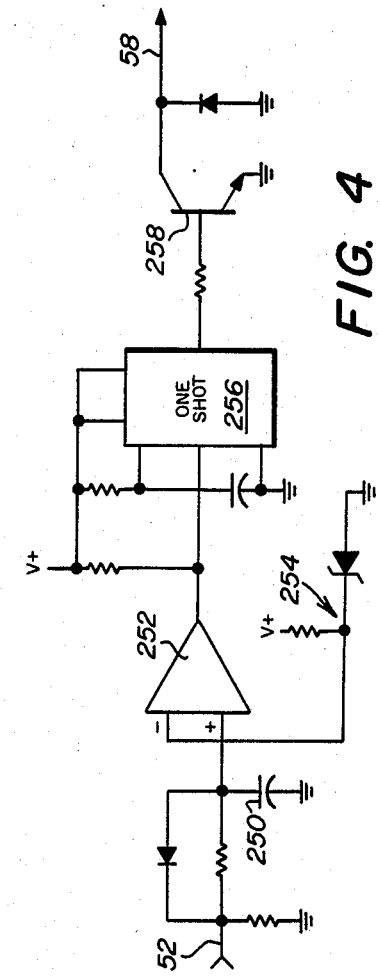
FIG. 4 is a schematic logic circuit diagram of the counter delay circuitry illustrated in FIG. 1.

Referring now to FIG. 4, counter delay circuitry 54 is illustrated. The output of access switches 40 which is applied through disable circuit 42 is applied via signal line 52 to a capacitor 250 and the positive input of a differential amplifier 252. The negative input of differential amplifier 252 is biased utilizing biasing network 254 such that a predetermined voltage level is applied to the negative input of differential amplifier 252. When capacitor 250 charges above this predetermined reference voltage level, differential amplifier 252 will provide an output to a one shot circuit 256.

The output of one shot circuit 256 is applied to a transistor 58 which provides a pulse to signal line 58 for incrementing counter 56. In this manner, upon each actuation of an access switch 40 by a user of the waste disposal system, counter 56 will be positively incremented since there is a delay introduced between the actuation of access switch 40 and the incrementation of counter 56 due to the charging of capacitor 250. Counter delay circuitry 54 thereby prevents the counting of inadvertent actuations of an access switch 40 by the user in that the user can deactuate access switch 40 without incrementing counter 56 if done so within a predetermined time. The predetermined time is controlled by the selection of capacitor 250 and the reference voltage level. One such counter delay circuitry 54 is associated with each access switch 40.

It therefore can be seen that the present waste disposal monitoring system controls the actuation of a valve to permit disposal of waste material from a source to a reservoir in addition to monitoring the density of the material being deposited into the reservoir to prevent disposal of undesirable waste material. Additionally, the present monitoring system provides for deactuation of the valve to prevent further fluid being deposited into the reservoir if the reservoir reaches a predetermined level. Furthermore, the present invention monitors the number of times a user uses the waste disposal system using a counter which is associated with access switches. To ensure that the counter accurately records the number of uses and to provide the user with an amount of time to deactuate an access switch, the present invention utilizes a counter delay circuitry.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A monitoring system for a fluid waste disposal system wherein fluid is transported from a source to a waste disposal reservoir comprising:
   valve means disposed between the source and the waste disposal reservoir for controlling fluid flow;
   switch means for selectively actuating said valve means for permitting fluid to flow from the source to the waste disposal reservoir;
   sensor means for sensing the density of the fluid and for generating an output signal when the density of the fluid increases above a predetermined level;
   first counter means responsive to said sensor means output signal for generating an alarm signal if said first counter means reaches a predetermined maximum count before being reset;
   second counter means interconnected to said first counter means for resetting said first counter means if said alarm signal is not generated within a predetermined time to thereby prevent generation of said alarm signal for the intermittent presence of fluid having a density above said predetermined level; and
   said valve means responsive to said alarm signal for preventing the continued flow of fluid from the source to the waste disposal reservoir.

2. The monitoring system of claim 1 wherein said alarm signal generates a visual display and an auditory alarm indicating the presence or fluid having a density above said predetermined level, and further including:
   third counter means for controlling the duration of said auditory alarm.

3. The monitoring system of claim 2 and further including:
   fourth counter means for generating a reset signal to said first, second, and third counter means after a predetermined time subsequent to the generation of said alarm signal to enable said switch means to reactuate said valve means to reinitiate fluid flow from the source to the waste disposal reservoir.

* * * * *

UNITED STATES PATENT AND TRADEMARK OFFICE
CERTIFICATE OF CORRECTION

PATENT NO. : 4,549,570

DATED : October 29, 1985

INVENTOR(S) : Kenneth D. Cook, Timothy R. Proctor

It is certified that error appears in the above-identified patent and that said Letters Patent is hereby corrected as shown below:

Column 6, line 57, after "is" insert --at the warning level and thus--.

Column 6, line 64, delete "at the warning level and thus".

Column 8, line 57, change "or" to --of--.

Signed and Sealed this

Fourth Day of February 1986

[SEAL]

Attest:

Attesting Officer

DONALD J. QUIGG

Commissioner of Patents and Trademarks